July 26, 1938.    G. A. BELLS    2,124,902
RADIUS TURNING APPARATUS
Filed May 5, 1931    5 Sheets-Sheet 2

INVENTOR
George A. Bells.
BY
John Flam
ATTORNEY

July 26, 1938.  G. A. BELLS  2,124,902
RADIUS TURNING APPARATUS
Filed May 5, 1931   5 Sheets-Sheet 3

INVENTOR
George A. Bells.
BY John F. Lam
ATTORNEY

July 26, 1938.　　　　G. A. BELLS　　　　2,124,902
RADIUS TURNING APPARATUS
Filed May 5, 1931　　　　5 Sheets-Sheet 4

INVENTOR
George A. Bells.
BY John Flam
ATTORNEY

July 26, 1938.  G. A. BELLS  2,124,902
RADIUS TURNING APPARATUS
Filed May 5, 1931   5 Sheets-Sheet 5

Inventor
George A. Bells
by John Flam
Attorney

Patented July 26, 1938

2,124,902

UNITED STATES PATENT OFFICE 2,124,902

RADIUS TURNING APPARATUS

George A. Bells, Los Angeles, Calif.

Application May 5, 1931, Serial No. 535,181

20 Claims. (Cl. 33—203)

This invention relates to an apparatus for properly aligning the front wheels of a motor vehicle, and more particularly to an apparatus for indicating the angularity of the axles of both of the front wheels with respect to the automobile body for all positions of steering.

Correction of uneven wear on tires, such as cupping, or what is known as a high center has long been a problem which has remained merely a matter of conjecture, as no satisfactory method of checking this error has been discovered up to the present time. Various methods have been utilized to check this apparent error in the front wheel alignment, but these have met with little or no success. The outstanding of the known methods, i. e. the frictional method of checking radius turning cannot positively be relied on. This is due to the fact that there is a large surface of the tire on the ground, and when making a turn, the outer area of the tire will travel much faster than the inside of the same tire in such a turn. Quite naturally, this will cause a slippage on the face of the tire, resulting in uneven wear or cupping. As it necessarily follows that this slipping condition must be dealt with on any instrument utilized to take frictional readings of radius turning error, it is readily apparent that the readings for toe-in, toe-out, or cupping errors cannot be satisfactorily checked even on a straight ahead position, due to variations in tires and treads.

In my copending application for a Radius gauge, Serial No. 272,439, filed April 24, 1928, patented March 17, 1931, No. 1,796,979, I have disclosed an apparatus which can satisfactorily check the radius turning error of front wheels. This apparatus in general consists of a fixed base disc or protractor plate fitted with annular bearings which allow the turnable disc or protractor plate to rotate under the front wheels of a motor vehicle, while cramping the wheels from right to left under the influence of the steering unit or otherwise. The reading of travel of the protractor plate indicates the number of degrees the wheels turn out of a straight ahead position. As different length wheel-base cars call for a difference in the degrees that each front wheel turns, the above described mechanism readily provides a means for checking the degree that each wheel turns out of its course. Experimentation has revealed the correct angularities of the axis of the front wheels with respect to the axle for all degrees of turn, on cars of any wheel base and any width. Accordingly, if the reading of travel of the protractor plates when the wheels are cramped from left to right or vice-versa, does not coincide with the known correct readings, the steering arms can be adjusted to correct the error. Front wheels when properly aligned will always have their axes intersect the axis of the rear wheels at a common point for all variable degrees of turn.

In the apparatus of my prior copending application, it is essential to place the front wheels thereof on the gauges, so that the axis of the king-pin about which the wheel axle turns intersects the center of the protractor plate before any correct readings can be made. As there are two known types of front axles, i. e. the Elliott type and reverse Elliott type, the king-pin assumes a different position with respect to the front wheels due to the construction of the respective types of axles. It is accordingly apparent that care must be exercised in properly positioning the front wheels on the gauges so that the king-pins assume their proper relation with respect to the center of the gauges. Obviously, this can be accomplished only by a "cut and try" method which necessitates constant checking and rechecking, and if great care is not exercised, error will result.

I have found that this error, which may result from a lack of due care, can be readily overcome by means of my present invention which obviates the necessity of positioning the axis of the king-pins in the manner hereinabove indicated. I accomplish this by means of an apparatus which automatically positions the front wheels for correctly measuring the angularities of the front wheels with respect to the body of the car, for all degrees of turn.

This apparatus comprises a pair of self-centering receptive members for automatically positioning the front wheels of a motor vehicle, so that when the wheels are cramped in either direction under the influence of the steering mechanism, their motion is translated to the receptive members which in turn act on or control an indicator to indicate the angularities of the wheels for all degrees of turn. The receptive members are relatively freely rotatable in a base or standard, and are capable of being so adjusted as to accommodate the front wheels of any width of tread vehicle in a self-centering position.

This is accomplished by forming one of the receptive members on a carriage which permits the lateral movement thereof in order to accommodate any tread width vehicle; and the forward and backward movement thereof simultaneously with the rotational movement for a purpose to be now described. This receptive member is positioned slightly below or in front of the other receptive member, so that one of the front wheels of the vehicle when propelled onto the base, will first encounter and be seated in this receptive member and cause it to be aligned with the other receptive member. Simultaneously with the alignment of the forward receptive member with the other member, the other front wheel becomes seated, and in this position both wheels are properly positioned for checking any radius turning error. The receptive members can in effect be in the form of a protractor plate as in my above named application, or they may be suitably interconnected in any desirable manner for simultaneously recording their relative degree of angular movement.

It is therefore an object of this invention to provide a self-centering radius turning apparatus which automatically positions the front wheels of a motor vehicle, when driven thereon, so that any radius turning error may be detected. Proper wheel aligning requires the axes of the front wheels to assume definite angularities with respect to the body of the vehicle for all degrees of turn; and that the axes of the front wheels intersect the axis of the rear wheels at a common point for all degrees of turn.

It is a further object of this invention to provide a radius turning apparatus which can readily accommodate and automatically self-center and position the front wheels of any wheel base or width tread vehicle.

It is a further object of this invention to provide a radius turning apparatus which can accurately indicate the radius turning error in the front wheels of a vehicle so that this error can be readily corrected and thus prolong the life of the tires.

It is a further object of this invention to provide a radius turning apparatus which is both simple in design and construction and relatively inexpensive to manufacture.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings.

The radius turning apparatus comprises an elongated rectangular base or platform 10 in which is mounted for rotation a pair of circular self-centering receptive members 11 and 12. These members are adapted to accommodate the front wheels of a vehicle for checking the radius turning error of the wheels. The receptive member 12 is adapted to coact with movable sections 13 and 13' of the base 10 to permit the necessary movement of the sections. The member 12 is capable of a lateral, forward, and backward movement. In its inactive position, it is slightly in front of or below the other receptive member 11. By driving the vehicle onto the receptive members, they become aligned and thus permit the unimpeded movement of the wheels and axle when cramping the former under the influence of the steering mechanism for checking radius turning error.

Figures 4, 5, 6, 8:
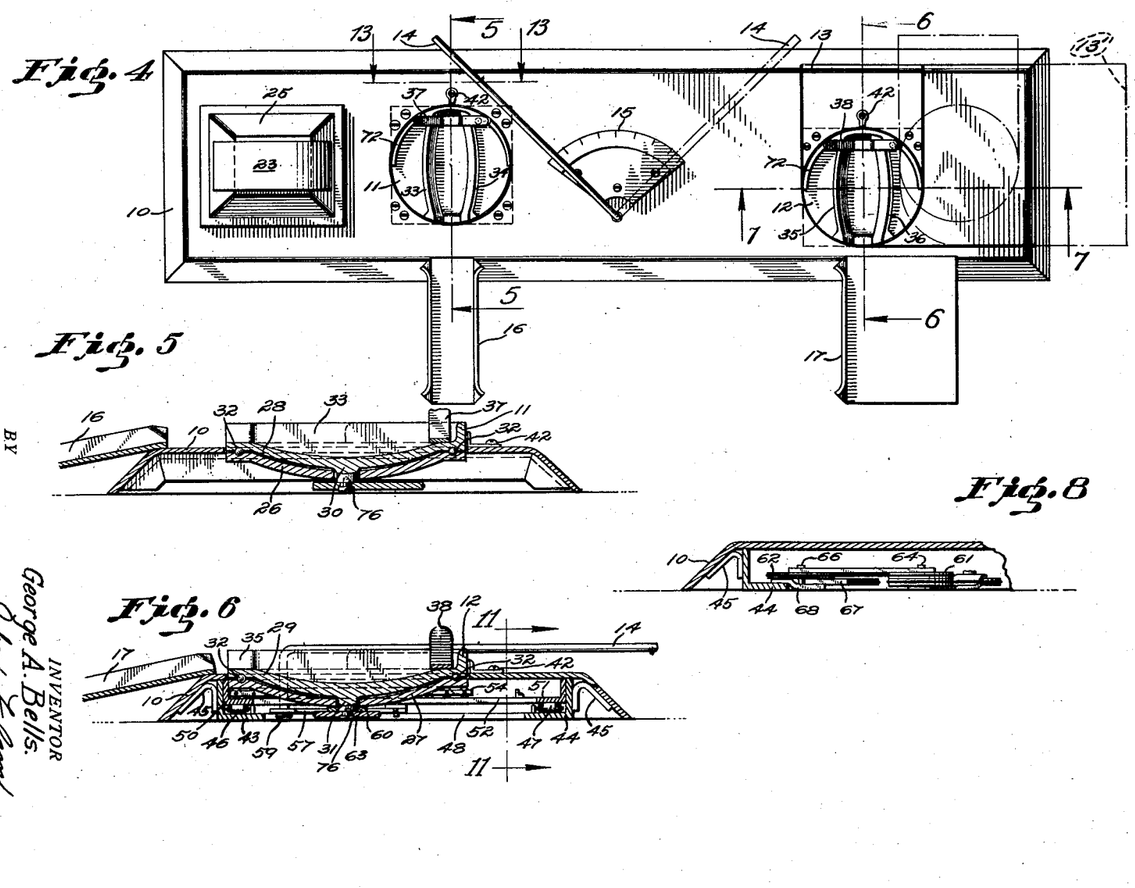
Fig. 4 is a plan view of the mechanism shown in Fig. 1.
Fig. 5 is a section through one of the self-centering receptive members taken along the plane 5—5 of Fig. 4.
Figs. 6 and 7 are sections along the planes 6—6 and 7—7 respectively of the other self-centering receptive mechanism.
Fig. 8 is a view taken along the plane 8—8 of Fig. 2.

The receptive member 12 is capable of a forward and backward movement for the purpose designated; and a lateral movement to cause a relative separation of the receptive members in order to accommodate the front wheels of any vehicle. This relative separation is effectuated prior to running the vehicle onto the members as by means of an elongated lever 14 (Fig. 4) and a suitable interconnected apparatus in a manner to be hereinafter described. An indicating segment 15 is secured to the platform 10 immediately under the lever 14 (Fig. 4.) This segment is provided with suitable markings indicative of the various wheel treads, and thus provides a reliable means for predetermining the degree of rotational movement of the lever 14 in order to effectuate the required relative separation of the receptive members. An inclined channel iron 16 directs one of the wheels of the vehicle to the member 11 and wide spaced L-iron 17 directs the other wheel to the member 12. In effect, these irons constitute trackways for the front wheels of any vehicle, due to the widely spaced L-iron 17.

Now if a vehicle be driven up the inclined runways provided by the irons 16 and 17, the right front wheel will first encounter the receptive member 12, and cause it to move forward in response to the continued forward movement of the vehicle. This movement of member 12 continues until the left wheel falls into the receptive member 11. In this position, member 12 is aligned with member 11, and the wheels are thus automatically self-centered in readiness for checking the radius turning error.

Figures 10, 14:
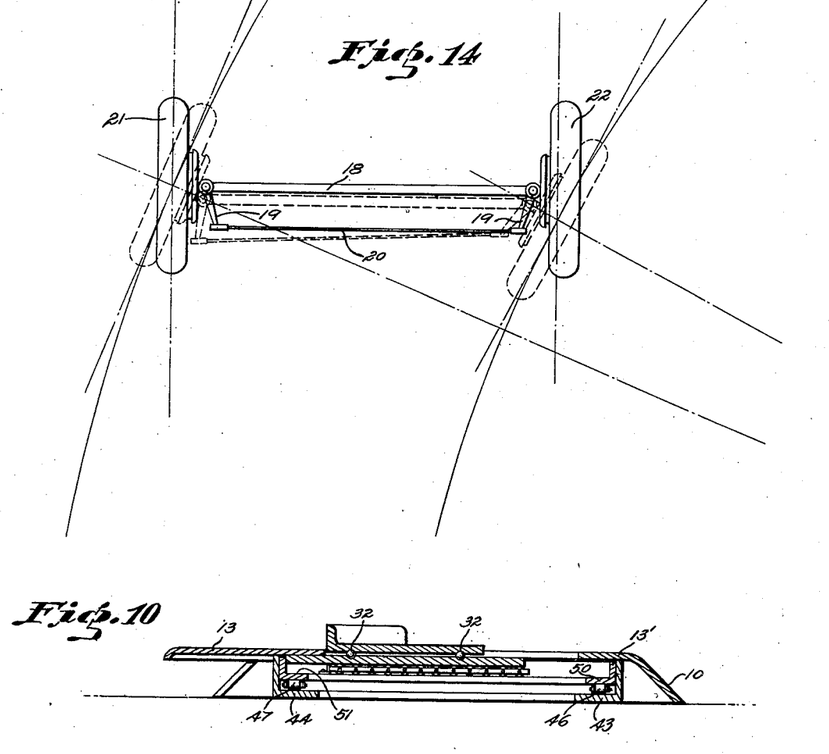
Fig. 10 is a section taken along the plane 10—10 of Fig. 7.
Fig. 14 is a diagrammatic view showing the movement of the wheels when cramped under the influence of the steering mechanism, and further showing the relative movement of the axle, the steering arms, and the connecting rod when the wheels are so cramped.

In Fig. 14, there is shown the position after movement of the front axle 18, the steering arms 19 and the connecting rod 20 when the wheels 21 and 22 are cramped, in the centered receptive members 11 and 12, from left to right. This position after movement is indicated by the dotted lines, and as is readily apparent, will cause the vehicle to move slightly backwards. This is brought about only by the provisions of the movable member 12 which is first caused to be moved forwards when the vehicle is driven on the receptive members, and then either further forwards or backwards, depending on the direction in which the wheels are cramped. It necessarily follows from this, that if the wheels are cramped in a direction opposite to that shown, the position of the wheels will be reversed, the dotted axle will now be in front of that shown, and the car will be caused to move slightly forwards.

The angles that the axes of the wheels 21 and 22 make with the axle when the wheels are cramped in either direction by the steering mechanism for a definite degree of turn, is indicated in degrees on a gauge 23 (Figs. 1 and 4) in a manner to be hereinafter described. If these readings do not check up with the known angularities for that definite turn, the error can be readily remedied by adjusting the steering arms 19 in a well-known manner. As hereinabove pointed out the axes of the front wheels must intersect the axis of the rear wheels at a common point for all degrees of turn, as it is only then that the wheels are properly aligned for correct radius turning.

Figures 1, 11:
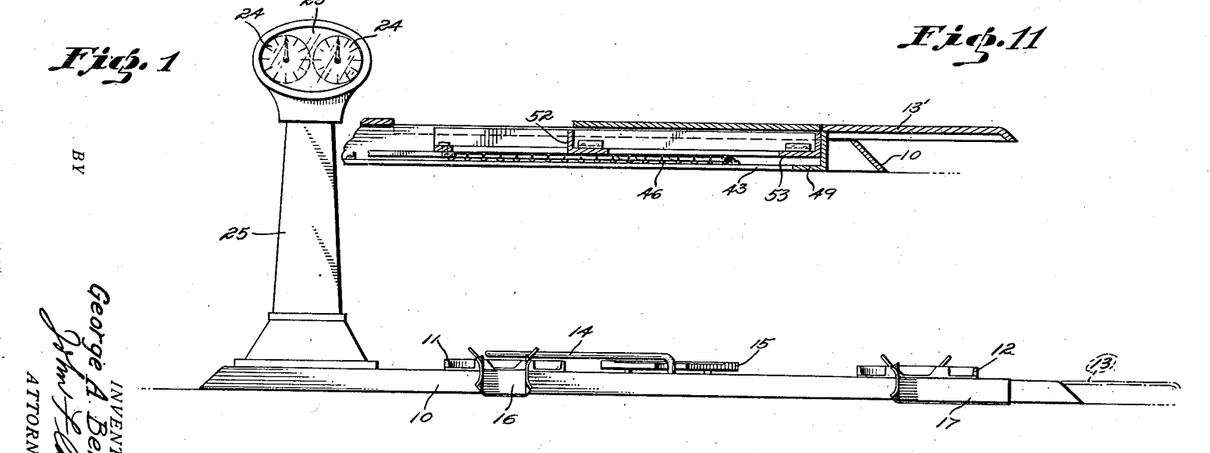
Figure 1 is a front elevational view of a radius turning apparatus embodying my invention and showing the common gauge for indicating the angularities of the wheels for all degrees of turn.
Fig. 11 is a section taken along the plane 11—11 of Fig. 6.

The gauge 23 comprises a pair of degree indicators 24, which indicate the degree of turn of the respective wheels. These indicators are positioned on top of a standard or pedestal 25 which in turn is mounted on one end of the base 10.

Figure 15:
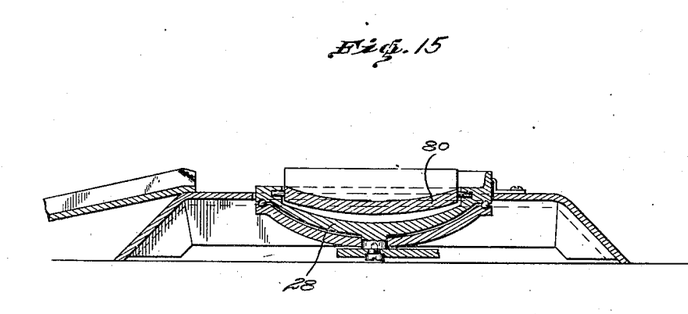
Fig. 15 is a view similar to Fig. 5, but illustrating a modified form of wheel receptive member.
Figure 16:
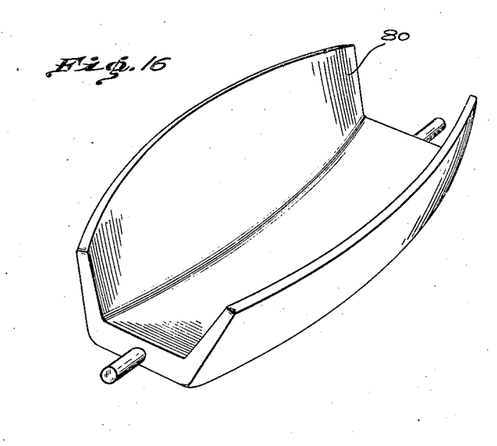
Fig. 16 is a perspective view of the wheel receptive member or cradle shown in Fig. 15.

Each of the receptive members 11 and 12 (Figs. 2, 5, 6 and 7) comprises a saucer shaped fixed base 26 and 27 secured to the underside of the base 10, and a turnable tire receptive plate 28 and 29 pivoted in an opening formed in the bottom of the fixed base. A stub shaft or extension 30 or 31 formed integral with plates 28 and 29 respectively extends through this opening and in effect acts as a pivot pin. To facilitate relative rotational movement between the plates and fixed bases of the receptive members, anti-friction members, such as ball-bearings 32, are disposed therebetween. The tire receptive plates 28 and 29 have a central tire receptive portion proper in line with the runways 16 and 17 which comprises a pair of opposed walls 33, 34 and 35 and 36 conforming substantially to the walls of the tires. In turning the wheels, they lean out of the vertical; and in order to ensure accurate alinement on the receptive members 28 and 29, I may provide a cradle 80 (Figs. 15 and 16) pivoted longitudinally in member 28 or 29. Thus this cradle provides a receptive member sufficiently flexible or yieldable in movement to lend itself to the lean of the wheel as it turns to right and left in checking for error, yet at the same time the contact position of the wheel is maintained in the receptive member. Stops 37, 38 can be provided to prevent the wheels from passing out of the members 36, 37.

Figure 7:
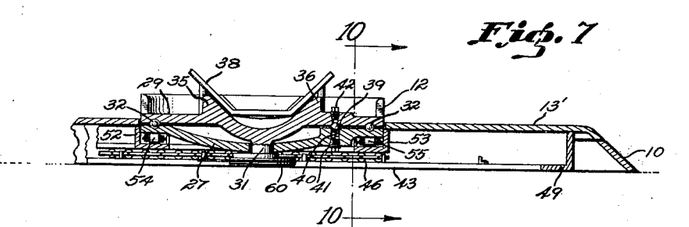

The relative rotation between the fixed bases and receptive plates of the receptive members 11 and 12 is normally hindered in a manner readily apparent from Fig. 7. The mechanism for accomplishing this comprises a brake formed by a ball 39 urged into a receptive or stop portion formed in the underside of the plate 29, as by a spring 40. The spring resides in an opening formed in the fixed base 27 and is held in place by and adapted to act against a plug 41. A removable plug 42 covers up an opening in the plate 29 which leads to the ball bearing 39, and thus permits the lubrication thereof when desired. Normally, the spring 41 urges the ball 39 into the receptive portion formed at the bottom of the opening into the plate 29 and prevents relative rotation of the plate with respect to the base. When the wheels of the vehicle rest on the plates, and are cramped thereon, the turning moment tends to dislodge the ball bearing 39 from its receptive portion to permit the desired relative rotation. It is apparent from the foregoing, that relative rotational movement between the receptive plates and fixed base is prevented only in one position, i. e. when the plates are in the position shown in Figs. 4 and 7.

The receptive plates 11 and 12 when cramped or rotated by the wheels under the influence of the steering mechanism, act to indicate on gauge 23 the degrees of turn of the wheels. This is accomplished by a simple mechanism in a manner now to be described.

A pair of angle irons 43 and 44 (Figs. 2, 3, 10) are secured to the respective sides of the base 10 on its reverse side, in any desirable manner, as by brackets 45 bolted to the walls of the base 10 and the legs of the angle irons 43 and 44. The bases of these angle irons are in opposed spaced relationship to the underside of the top of the base 10 and in effect form a runway for a carriage and anti-friction members 46 and 47 (Figs. 2, 3, 6, and 7). A pair of cross pieces or angle irons 49 and 48 are secured to the angle irons 43 and 44 at and adjacent the extremities thereof respectively for a purpose to be hereinafter described.

Figure 2:
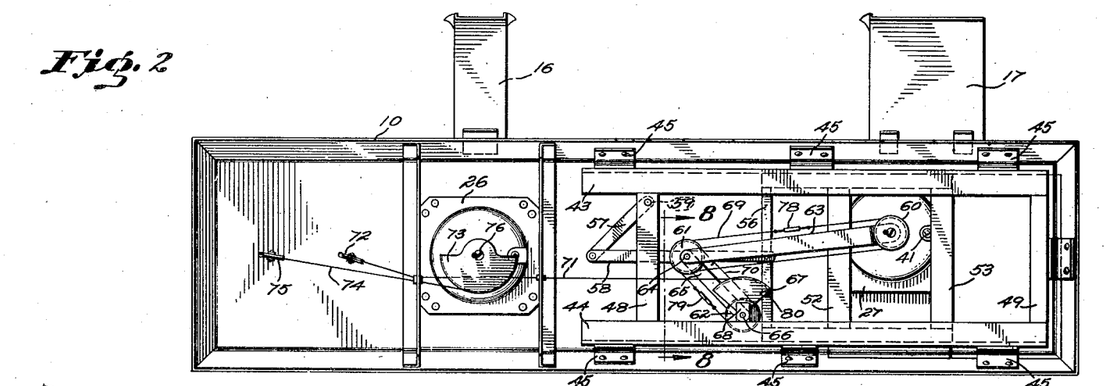
Fig. 2 is a bottom view thereof showing the interconnected mechanism for simultaneously recording the angularities of both wheels on the gauge.
Figure 3:
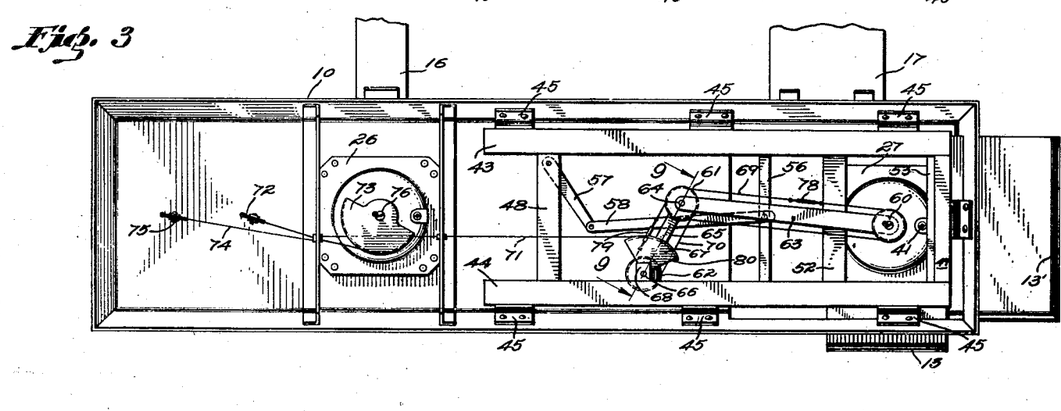
Fig. 3 is a view similar to Fig 2 and showing the relation of the parts when the mechanism is set for a vehicle having a large width between the tires.

The carriage hereinabove referred to carries and supports the receptive member 12 to permit the lateral as well as the forward and backward movement thereof. It comprises a pair of smaller angle irons 50 and 51 (Fig. 10) coincident with the angle irons 43 and 44, with the legs of one in slidable contact to the legs of the other and the bases of the former overlying the bases of the latter and resting on the bearings 46 and 47. A pair of opposed angle iron crosspieces, 52 and 53, (Figs. 2, 7 and 11) maintain the position of the irons 50 and 51 and provide a runway for the receptive member 12 to permit the forward and backward movement thereof. Anti-friction chain bearings 54 and 55 are interposed between the fixed seat 27 and the base of the cross-pieces 52 and 53 to eliminate friction between them. The cross-piece 53 forms one end of the carriage and a cross-piece 56 the other end. The carriage as described is limited in movement on its runway in one direction by the cross-piece 49 (Figs. 7 and 11), and in the other direction by a pair of cooperating links 57 and 58 (Figs. 2 and 3).

Link 57 is secured at one end to the lower end of lever 14 as at 59 (Figs. 2 and 6) and is pivotally connected at its other end to one end of the link 58. The other end of link 58 is connected substantially centrally to the cross end piece 56 of the carriage. It is now readily apparent that the movement of the lever 14 (Fig. 4) in a clockwise direction causes a lateral movement of the carriage and the consequent lateral movement of the receptive member 12 and the movable section 13'. Fig. 2 shows the relative position of the parts when the lever 14 is in the position indicated by the full lines (Fig. 4); and Fig. 3 shows the relative position of the parts when the lever 14 is in the position indicated by the dotted lines. The two extreme positions shown permit the accommodation of the front wheels, of a vehicle of the smallest and largest wheel separation respectively, on the receptive members 11 and 12. Of course, any intermediate position of the lever 14 will separate the receptive members so as to accommodate the wheels of an intermediate wheel separation.

Secured to the bottom of the stub shaft 31 (Figs. 2, 6 and 7) is a pulley or sheave 60 adapted to be rotated with the receptive member 12. Rotation of the sheave 60 is translated to a compound sheave 61, to a sheave 62, and in turn to the right hand gauge 24 (Fig. 1) through the instrumentality of cable wires or lines in a manner now to be described.

Figure 9:
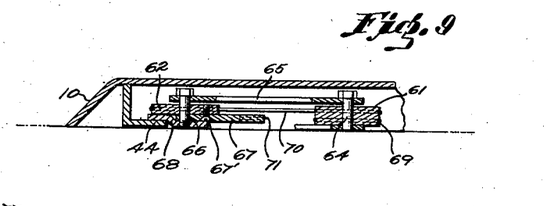
Fig. 9 is a section taken along the plane 9—9 of Fig. 3.

A link 63 is secured at one end to the stub shaft 31 below the sheave 60. This link is secured to the compound sheave 61 as by a pivot pin 64 passing through the sheave and the free end of the link. The compound sheave 61 is in turn connected to the sheave 62 as by a link 65 pivotally connected to the sheaves by pins 64 and 66 respectively. A segmental pulley or sheave 67 is connected to and adapted to rotate or oscillate with the sheave 62 as by means of a screw 67' (Fig. 9). Both the sheave 62 and segment 67 are pivotally secured to the pin 66 which in turn is secured to an upright member 68 welded or secured to the angle iron 44 in any desirable manner. A cable line 69 imparts the rotation of the sheave 60 to sheave 61; a cable line 70 imparts the rotation of sheave 61 to sheave 62 and in turn to sheave segment 67; and a cable 71, extending about a pulley 72, imparts the rotation of the segment 67 to the indicating gauge. As the manner of accomplishing this is well known in the art, no further details of design and construction are deemed necessary.

The relative rotation of receptive member 11 is imparted directly to the left hand gauge 24 through the instrumentality of a mutilated sheave 73, a cable 74 and a pulley 75. Sheave 73 is secured to and adapted to rotate with the receptive member 11 as by a screw 76 extending through the sheave and into the stub post 30.

Figure 12:
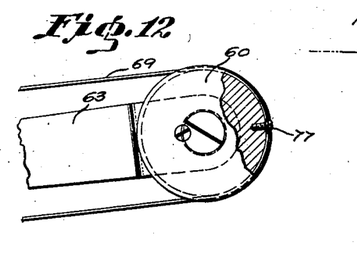
Fig. 12 is an enlarged detail view with part in section of a portion of the mechanism shown in Figs. 2 and 3.

The cables 69 and 70, extending about the sheaves 60 and 61; 61 and 62 respectively, are secured thereto in such a manner that relative rotational movement of the sheaves is obviated when the carriage is moved by lever 14 from the position shown in Fig. 2 to that shown in Fig. 3. This is accomplished by fastening the cables at their bight portion directly to the sheaves as by a screw 77 in a manner readily apparent from an inspection of Fig. 12. In this manner, when the carriage and incidentally the links 63 and 65 are caused to move laterally, the cables 69 and 70 merely unwrap from one side of the sheave and wrap up on the other side, and thus have no rotational effect on the sheaves which would tend to affect the reading on the gauges. It is only when the receptive member is actually rotated by the wheels of a vehicle, or otherwise, that the angular movement thereof is recorded or indicated by the gauge. Turn-buckles 78 and 79 are made a part of the cables 69 and 70 in order to provide a means for maintaining them tightly about their respective sheaves.

The cable 71 is secured to the right hand end of the segmental sheave as by a screw 80 (Fig. 3). This segmental sheave is secured to the sheave 62 so that its center of rotation is coincident with the center of rotation of the sheave. In this manner the degree of angular movement of the sheave 62 is translated to the segmental sheave 67, to be in turn translated to the indicating gauge through the instrumentality of the cable 71. As hereinabove pointed out, the degree of angular movement of the respective sheaves 60, 61 and 62 is always the same as the degree of angular movement of the wheel in the receptive member, and accordingly is indicated, without possibility of error, on the gauge. This is due to applicant's novel arrangement of the elements which permits lateral movement of the parts without affecting the rotational movement thereof; and which imparts the same degree of rotation to all the rotational elements in response to the rotational movement of the receptive member.

If desired, the relative rotational movement of the wheels in the receptive members can be indicated directly without necessitating the use of a gauge such as gauge 23 and its interconnecting cables, links, and sheaves. This can be accomplished in a manner readily apparent from Fig. 13. The forward portion or rim 72 of the receptive members 10 or 11 can be provided with a zero point 73, and graduation in degrees, indicated at 75, upon opposite sides of the zero point. A pointer may be secured in any desirable manner to the wheels or tires so as to directly overlie the zero point. Now if the wheels are cramped from left to right or vice-versa, the degree of rotational movement will be indicated by the position of the pointer with respect to the graduations 74. It is also possible and within the purview of this invention to check the angular movement of the wheels by securing a pointer on the hub so as to overlie a zero point instead of clamping the pointer to the wheels or tires directly.

Gauges can thus be used merely as a turntable placed under the front wheels so that the car can be turned easily from extreme right hand turn to the left hand turn, eliminating friction under tires and that the system of pointing or reading can be placed in any suitable position and can be read in any manner, using inches of travel of wheels out of their course or can be measured in degrees or other form for predetermining angles of front wheels.

The operation of this device is now apparent from the foregoing. The handle or lever 14 is moved in a clockwise direction to separate the receptive members 11 and 12 in order to accommodate the front wheels of the particular vehicle to be checked. The vehicle is now propelled onto or driven up the inclined runways provided by the channel irons 16 and 17 until the right front wheel encounters the receptive member 12. The forward movement of the vehicle is continued until the left wheel rolls into the receptive member 11. When this happens, both of the receptive members are aligned due to the forward movement of receptive member 12, and the wheels are now centered. The wheels are now cramped by the steering mechanism from left to right and vice-versa, and the readings of the angular movement is shown by the gauge 23. If these readings do not check up with the required readings for the definite degree of turn, error exists which can be readily remedied by adjusting the steering arms.

Figure 13:
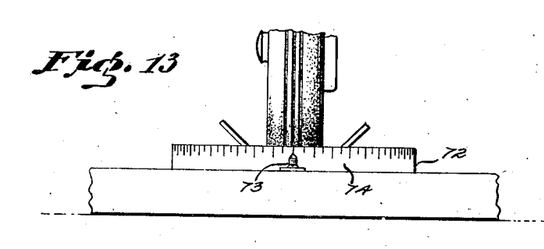
Fig. 13 is a view taken substantially along the plane 13—13 of Fig. 4.

The upright gauge 23 is particularly advantageous, as the driver of the vehicle can readily read the radius turnings of the wheels from the driver's seat, and accordingly but one person is necessary to check the radius wheel alignment. Of course, if an indicator such as shown in Fig. 13 be used, two persons are necessary; one to cramp the wheels, and one to take the readings.

I claim:

1. In a wheel aligning apparatus, a wheel receptive member comprising a base and side walls forming a cradle for the tire on the wheel, said side walls substantially conforming to the contour of the tire, and said base being in substantially dish form whereby a wheel rolled on said receptive member will automatically center itself thereon.

2. In a wheel aligning apparatus, a wheel receptive member comprising a base and side walls forming a cradle for the tire on the wheel, said side walls substantially conforming to the walls of the tire, and said base having surfaces which slope outwardly and upwardly from a central point whereby a wheel rolled on said receptive member will automatically assume a centralized position with a diameter of the wheel directly overlying the central point of the base.

3. In a radius wheel aligning apparatus, a wheel receptive member comprising a base and side walls forming a cradle for the tire on the wheel, said side walls substantially conforming to the walls of the tire, and said base having surfaces which slope outwardly and upwardly from a central point whereby a wheel rolled on said receptive member will automatically assume a centralized position with a diameter of the wheel directly overlying the central point of the base, and a stopping member bridged across the forward end of the side walls to limit the forward movement of the wheels in the receptive member.

4. In a wheel aligning apparatus, a wheel receptive member consisting of a pair of relatively movable members, one of said members comprising a base and side walls forming a cradle for the tire on the wheels, said side walls substantially conforming to the walls of the tire, and said base having surfaces which slope outwardly and upwardly from a central point whereby a wheel rolled on said member will automatically assume a centralized position, and means for mounting said members in relatively movable manner.

5. In a radius wheel aligning apparatus, a wheel receptive member consisting of a pair of relatively movable members, one of said members comprising a base and side walls forming a cradle for the tire on the wheels, said side walls substantially conforming to the walls of the tire, and said base having surfaces which slope outwardly and upwardly from a central point whereby a wheel rolled on said member will automatically assume a centralized position, means for mounting said members in relatively movable manner and means normally maintaining said members in a relatively immovable position, said means being responsive to pressure thereon whereby a relative movement between the members is permitted.

6. In a wheel aligning apparatus, a base, a pair of rotational and relatively movable wheel receptive members mounted on the base, said members each incorporating means whereby the front wheels of a vehicle driven onto the base will automatically position themselves in the receptive members in a centered position.

7. In a radius wheel aligning apparatus, a base, a pair of rotational and relatively movable wheel receptive members mounted on the base, one of said members being positioned in front of the other member, and a guide for said one member, whereby one of the wheels of a vehicle driven onto the base will first encounter said member and cause it to advance forward in its guide until it is aligned with the other member.

8. In a radius wheel aligning apparatus, a base, a pair of rotational and relatively movable wheel receptive members mounted on the base, one of said members being positioned in front of the other member, a guide for said one member, whereby one of the wheels of a vehicle driven onto the base will first encounter said member and cause it to advance forwards until it is aligned with the other member, in which position both wheels assume a centered position necessary for checking radius error, and means whereby said member will be advanced in one direction when the receptive members are rotated in one direction, and moved backwards in the opposite direction when the members are rotated in the opposite direction.

9. In a radius wheel aligning apparatus, a base, a pair of rotational and relatively movable wheel receptive members mounted on the base, one of said members being positioned in front of the other member, a guide for said one member, whereby one of the wheels of a vehicle driven onto the base will first encounter said member and cause it to advance forwards until it is aligned with the other member, in which position both wheels assume a centered position necessary for checking radius error, means whereby said member will be advanced in one direction when the receptive members are rotated in one direction, and moved backwards in the opposite direction when the members are rotated in the opposite direction, a gauge, and means responsive to the rotational movement of said members to actuate said gauge and thereby indicate the relative angular movement of said members.

10. In a radius wheel aligning apparatus, a pair of spaced rotational wheel receptive members, means for mounting one of said members for movement in a lateral direction whereby the space between said members may be increased for accommodating the front wheels of any width tread vehicle, and for mounting said member to move in either direction transverse to the lateral direction.

11. In a radius wheel aligning apparatus, a base, a pair of spaced rotational wheel receptive members, a carriage, one of said members being mounted in said carriage, means for mounting said carriage for movement in a lateral direction whereby the relative spacing between said receptive members can be increased for accommodating the front wheels of any width tread vehicle, and means for mounting said member for movement on the carriage in either direction transverse to the lateral direction.

12. In a radius wheel aligning apparatus, a base, a pair of spaced rotational wheel receptive members, a carriage, one of said members being mounted in said carriage, means for mounting said carriage for movement in a lateral direction whereby the relative spacing between said receptive members can be increased for accommodating the front wheels of any width tread vehicle, in a centered position for checking radius turning error, a gauge, and means responsive to the rotational movement of said members to actuate said gauge and thereby indicate the relative angular movement of said members, and means for mounting said member for movement in said carriage in either direction transverse to the lateral direction when said member is rotated.

13. In a radius wheel aligning apparatus, a base, a pair of spaced rotational wheel receptive members, a carriage, one of said members being mounted in said carriage, means for mounting said carriage for movement in a lateral direction whereby the relative spacing between said receptive members can be increased for accommodating the front wheels of any width tread vehicle, a guide for said member, for positioning it in front of the other member whereby one of the wheels of a vehicle driven onto the base will first encounter said member and cause it to move forwards in said carriage until it is aligned with the other member, in which position both front wheels assume a centered position necessary for checking radius error, a gauge, means responsive to the rotational movement of said members to actuate said gauge and thereby indicate the relative angular movement of said members, and means for mounting said member for movement in said carriage forwards from its centered position when the member is rotated in one direction, and backwards when the member is rotated in the opposite direction.

14. In a radius wheel aligning apparatus, a pair of spaced rotational wheel receptive members, means for mounting one of said members for movement in a lateral direction whereby the space between said members may be increased for accommodating the front wheels of any width tread vehicle, and for mounting said member to move in either direction transverse to the lateral direction, a gauge, and means responsive to the rotational movement of said members to actuate said gauge and thereby indicate the relative angular movement of said members, said means including elements whereby lateral movement of said member does not actuate the gauge.

15. In a radius wheel aligning apparatus, a base, a pair of spaced rotational wheel receptive members, a carriage, one of said members being mounted in said carriage, means for mounting said carriage for movement in a lateral direction whereby the relative spacing between said receptive members can be increased for accommodating the front wheels of any width tread vehicle, in a centered position for checking radius turning error, a gauge, means responsive to the rotational movement of said members to actuate said gauge and thereby indicate the relative angular movement of said members, and means for mounting said member for movement in said carriage in either direction transverse to the lateral direction when said member is rotated, said means including elements whereby lateral movement of said carriage, and incidentally said member, does not actuate the gauge.

16. An apparatus for aligning the wheels of motor vehicles comprising a pair of wheel supporting blocks, means for pivotally supporting the blocks and for permitting movement thereof towards and from each other, and means responsive to the turning movement of the blocks for indicating the position of said blocks relative to the supports on which they are mounted.

17. An apparatus for aligning the wheels of motor vehicles comprising a supporting base, an elongated wheel supporting block turnable on said base, and upstanding walls at opposite sides of said block spaced apart equal to the thickness of the wheel tire and between which the latter is received to cause the block to assume the alignment of the wheel.

18. An apparatus for aligning the wheels of motor vehicles comprising a supporting base, an elongated wheel supporting block turnable on said base, upstanding walls at opposite sides of said block spaced apart equal to the thickness of the wheel tire and between which the latter is received to cause the block to assume the alignment of the wheel, and means for indicating the turning movement of said block.

19. A gauge for the purpose indicated comprising a supporting base, a wheel-supporting table operatively connected thereto and mounted thereon for motion in any horizontal direction and for rotation, and means for indicating amount of rotational movement of said table.

20. A gauge for the purpose indicated comprising a supporting base, a wheel supporting table operatively connected thereto and mounted thereon for motion in any horizontal direction and for rotation, and means for indicating the amount of rotational movement of said table, said table having upon its upper face substantially parallel upwardly extending projections for causing a wheel resting on the table to assume a definite position with relation thereto.

GEORGE A. BELLS.